Oct. 21, 1947.         L. SCHMERLING         2,429,373
MANUFACTURE OF 2,2,3-TRIMETHYLBUTANE
Filed March 17, 1944
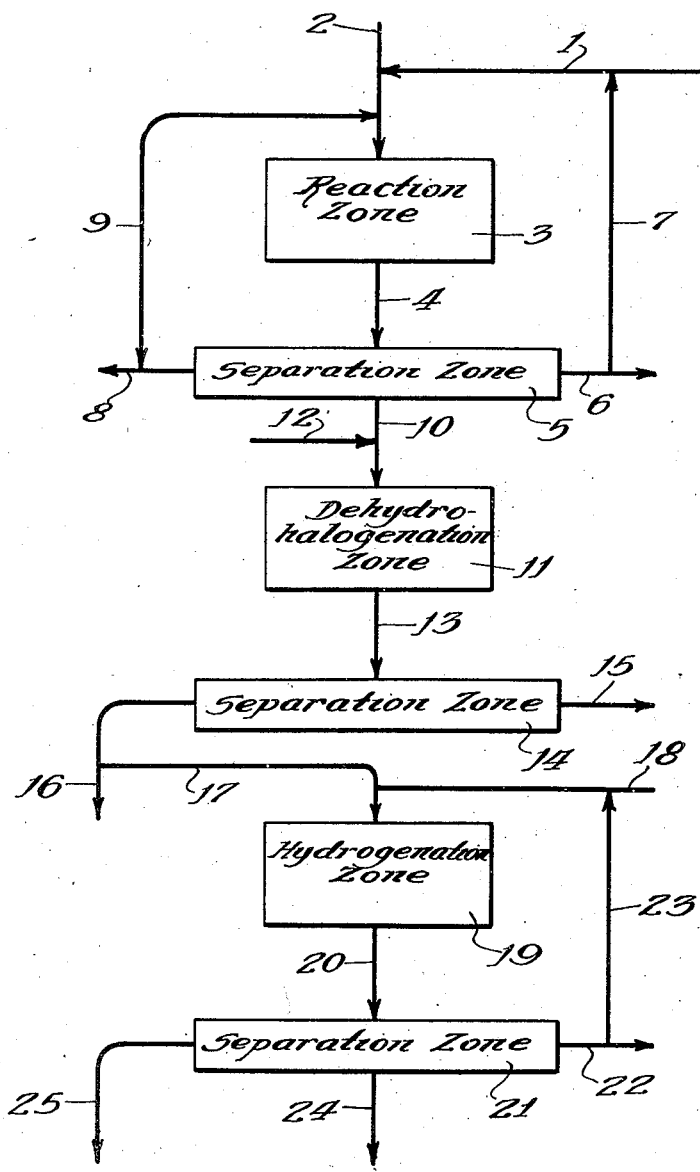
Inventor:
Louis Schmerling
By: Lee J. Gary
Attorney:

Patented Oct. 21, 1947

2,429,373

UNITED STATES PATENT OFFICE 2,429,373

MANUFACTURE OF 2,2,3-TRIMETHYL-BUTANE

Louis Schmerling, Riverside, Ill., assignor to Universal Oil Products Company, Chicago, Ill., a corporation of Delaware Application March 17, 1944, Serial No. 526,906

6 Claims. (Cl. 260—683.6)

The present invention is concerned with a process for synthesizing hydrocarbons of branched structures which are useful as constituents of high antiknock gasolines, particularly aviation gasolines.

An object of this invention is the production of branched chain saturated hydrocarbons including branched chain paraffinic hydrocarbons.

A further object of this invention is the conversion of 2,3-dimethylbutene into a substantial yield of highly branched chain heptane.

Another object of this invention is the production of triptane.

One specific embodiment of the present invention relates to a process for manufacturing branched chain saturated hydrocarbons which comprises reacting an olefin having at least 6 carbon atoms per molecule with an α-haloalkyl ether, dehydrohalogenating the resultant higher boiling alkoxy halo compound, and hydrogenating the dehydrohalogenated material to a saturated hydrocarbon.

A further embodiment of the present invention relates to a process which comprises condensing a 2,3-dimethylbutene and an α-chloroalkyl ether to form a higher boiling alkoxy chloroalkane, dehydrohalogenating said alkoxy chloroalkane to an alkoxyalkene, and hydrogenating the latter to a paraffinic hydrocarbon.

A still further embodiment of the present invention relates to a process which comprises condensing 2,3-dimethylbutene-2 with chloromethyl ether forming 2-chloro-4-methoxy-2,3,3-trimethylbutane, dehydrochlorinating said 2-chloro-4-methoxy-2,3,3-trimethylbutane by heating with methanol to form methoxyheptene, and hydrogenating said methoxyheptene to form a paraffinic hydrocarbon mixture comprising essentially 2,3-dimethylbutane, 2,3-dimethylpentane, and triptane.

In the first step of the process when used for producing triptane, 2,3-dimethylbutene-2 is reacted with chloromethyl ether preferably in the presence of a Friedel-Crafts type catalyst such as bismuth chloride, mercuric chloride, zinc chloride, etc., at a temperature of from about 0° to about 50° C. to give a substantial yield of 2-chloro-4-methoxy-2,3,3-trimethylbutane. This step of the process may also be carried out by reacting 2,3-dimethylbutene with methanol and formaldehyde in the presence of hydrogen chloride and of a Friedel-Crafts catalyst.

The second step of the process which comprises dehydrohalogenation of the 2-chloro-4-methoxy-2,3,3-trimethylbutane may be carried out by heating the chloromethoxy compound with an aqueous alkali solution, but this dehydrochlorination is preferably effected by heating the chloromethoxy trimethylbutane with methanol at a temperature of from about 150° to about 250° C. In some cases it appears advantageous to have magnesium oxide present in the mixture being subjected to dehydrochlorination treatment.

In the third step of my combination process when applied to triptane production, the dehydrochlorinated reaction product comprising methoxyheptene is hydrogenated, for example, in pentane solution in the presence of a nickel-hydrogenating catalyst. When this treatment was carried out at a temperature of about 100° C., the resultant product was methoxyheptene, 4-methoxy-2,3,3-trimethylbutane, also known as a methyl heptyl ether, as only the double bond was hydrogenated and no hydrogenolysis at the methoxy linkage occurred. Conversion of methoxyheptene into branched chain heptanes was accomplished by carrying out the hydrogenation at a higher temperature of about 160° C. The hydrocarbon mixture so produced contained 2,3-dimethylbutane, 2,3-dimethylpentane and 2,2,3-trimethylbutane (triptane.)

The presence of 2,3-dimethylpentane in the reaction product indicated that rearrangement of the carbon skeleton of the original 4-methoxy-2,3,3-trimethylbutene occurred, probably during the hydrogenolysis.

The preceding paragraphs have indicated reactions involved in the three steps of the process, the preferred ranges of operating temperatures, and the alternative catalysts. In carrying out any of the steps, any type of batch or continuous procedure may be employed, also the products from each step may be fractionated and unconverted materials may be recycled to further reaction.

Alternatively, with the use of 2,3-dimethylbutene as a starting material for the first step of the process, other mono-olefins of open chain character and having at least six carbon atoms per molecule may be employed in the condensation with an α-chloroalkyl ether. Said condensation apparently involves the addition of a chloroalkyl ether to the double bond of the olefinic hydrocarbon. The α-chloroalkyl ethers include chloromethyl methyl ether, α-chloroethyl ethyl ether, bis-chloromethyl ether, bis-α-chloroethyl ether, etc. The chloroalkoxy compound formed in the condensation is then subjected to dehydrochlorination as hereinabove set forth to form an alkoxyalkene or alkoxyalkanol. Such dechlorinated material is then hydrogenated catalytically to form saturated hydrocarbons useful as blending materials in gasoline.

The invention is explained further in connection with the attached drawing which is a flow diagram illustrating one specific embodiment of the invention although it is not intended to unduly limit the broad scope thereof.

Referring to the drawing and using the production of triptane as an illustration of my process, chloromethyl ether is introduced through line 1 and mixed in line 2 with the hydrocarbon charging stock comprising 2,3-dimethylbutene-2 and the resulting mixture is directed through line 2 to reaction zone 3. The catalyst may have been disposed previously in reaction zone 3 or, when desired, it may be introduced to said zone through lines 1 and 2 with the chloromethyl ether and hydrocarbon charging stock. Reaction zone 3 may comprise any suitable apparatus for effecting the desired reaction, but said reaction zone is preferably equipped with a stirrer or other suitable mixing device in order to insure adequate contacting of the reactants and the catalyst. In a continuous type of operation, the catalyst may be withdrawn continuously or intermittently from reaction zone 3 in any suitable manner, not illustrated in the drawing, while in a batch type of operation the catalyst may be removed from the reaction zone after the run has been terminated.

The conversion products are withdrawn from zone 3 through line 4 to separation zone 5 which comprises any suitable means for separating into fractions the products introduced thereto. Separation zone 5 may comprise a fractional distillation zone containing bubble trays, baffle plates, or the like. Unconverted products may be separated from the desired halo-alkoxyalkane such as 2-chloro-4-methoxy-2,3,3-trimethylbutane.

The unconverted olefin may be withdrawn from the upper portion of zone 5 through line 6 and withdrawn from the process, but preferably at least a portion thereof is recycled by way of lines 7 and 1 to line 2 and thence to reaction zone 3 for further conversion therein. Similarly, any unconverted halo-alkyl ether may be directed from zone 5 through line 8 and withdrawn from the process, but preferably at least a portion thereof is recycled by way of lines 9 and 2 to reaction zone 3 for further conversion therein.

The halo-alkoxyalkane formed in the process and such as 2-chloro-4-methoxy-2,3,3-trimethylbutane, is withdrawn from zone 5 through line 10 and directed to dehydrohalogenation zone 11 which may comprise any suitable apparatus utilizable for effecting the desired reaction. A catalyst may be introduced to or withdrawn from zone 11 in any suitable manner or it may be disposed therein and used until its activity has diminished to below a practical extent. Dehydrochlorination, for example, may be carried out in zone 11 by heating a chloroalkoxyalkane with methanol or with an aqueous solution of an alkali, said methanol or solution being introduced to zone 11 through lines 12 and 10.

The products of the dehydrohalogenation reaction are withdrawn from zone 11 through line 13 to separation zone 14 which may be similar to the above-described zone 5. If methanol is employed as the dehydrohalogenation agent in zone 11, methyl chloride, methyl ether, and excess methanol are separated in zone 14 and withdrawn therefrom through line 15 to storage or elsewhere, as desired.

The olefinic ether formed in the dehydrohalogenation reaction may be separated in zone 14 and withdrawn therefrom through line 16, but preferably all or a portion thereof is directed through line 17, wherein it is commingled with hydrogen introduced through line 18, and the mixture is then directed to hydrogenation zone 19. Hydrogenation zone 19 may likewise comprise any suitable apparatus for effecting the desired reaction and usually comprises one or more reaction zones containing a fixed bed of hydrogenation catalyst.

The hydrogenated products are then directed from zone 19 through line 20 to separation zone 21 wherein branched chain hydrocarbons are separated from excess hydrogen and from an alcohol such as methanol, resulting from hydrogenation of the alkyl alkenyl ether produced by dehydrohalogenation of the halo-alkoxy alkane referred to above. The excess hydrogen is removed from separation zone 21 through line 22 and withdrawn from the process, but preferably at least a portion thereof is recycled by way of lines 23, 18 and 17 for further use in hydrogenation zone 19. The desired branched chain hydrocarbon such as triptane may be withdrawn from zone 21 through line 24 to cooling and storage, not indicated in the diagrammatic drawing. Methanol or another alcohol resulting from the hydrogenation treatment in zone 19 may be withdrawn from separation zone 21 through line 25.

The following example is given to illustrate the character of results obtained by the use of the present process, although the data introduced are not presented with the intention of unduly limiting the generally broad scope of the invention.

80 parts by weight of chloromethyl ether, 81 parts by weight of 2,3-dimethylbutene-2, and 4 parts by weight of mercuric chloride were mixed at 20° C. While the mixing was continued, the heat of reaction increased the reaction temperature to 48° C. in 8 minutes and thereafter the reaction mixture was kept at a temperature of 45° to 50° C. for an additional period of 45 minutes, after which the exothermic reaction had ceased. After the reaction mixture stood at 20° C. for 15 hours, the liquid was decanted from the catalyst, washed with dilute alkali, dried, and distilled. This distillation separated from the reaction product 70 volumes (67 parts by weight) of 2-chloro-4-methoxy-2,3,3-trimethylbutane which boiled at 59° C. at a pressure of 10.5 mm. of mercury and had a refractive index, $n_D^{20}$, of 1.4428.

For the dehydrochlorination of 2-chloro-4-methoxy-2,3,3-trimethylbutane, 15 parts by weight of this chloromethoxyheptane, 40 parts by weight of methanol, and 2 parts by weight of magnesium oxide were heated in a rotating autoclave at 200° C. for 4 hours. The resultant product was washed with water, dried, and distilled. Fractional distillation separated therefrom 10.2 volumes of 4-methoxy-2,3,3-trimethylbutene-1 which is a methyl heptenyl ether boiling from 127 to 133° C. at 760 mm. pressure and having a refractive index, $n_D^{20}$, of from 1.4215 to 1.4230.

A solution of 12 parts by weight of the above described methyl heptenyl ether, which may also be called a methoxyheptene, in 21 parts by weight of pure n-pentane was heated at 160° C. and 100 atmospheres pressure in a steel autoclave in the presence of hydrogen and of a mixture of 2 parts by weight of powdered alumina and 3 parts by weight of nickel-diatomaceous earth hydrogenation catalyst. The hydrogenated product comprised a paraffinic hydrocarbon mixture containing 30% of 2,3-dimethylbutane, 40% of 2,3-dimethylpentane, and 30% of triptane.

The nature of the present invention and its commercial utility can be seen from the specification and example given, although neither section is intended to limit its generally broad scope.

I claim as my invention:

1. A process which comprises reacting a 2,3-dimethylbutene and chloromethyl methyl ether to form a methoxy chloroheptane, dehydrochlorinating said methoxy chloroheptane to form methoxyheptene, and hydrogenating and hydrogenolyzing the latter to form 2,2,3-trimethylbutane.

2. A process which comprises reacting 2,3-dimethylbutene-2 and chloromethyl methyl ether in the presence of a Friedel-Crafts metal halide catalyst to form a methoxy chloroheptane, dehydrochlorinating said methoxy chloroheptane to form a methoxyheptene, and hydrogenating and hydrogenolyzing the latter at conditions adequate to form a paraffinic hydrocarbon mixture containing a substantial proportion of 2,2,3-trimethylbutane.

3. A process for the production of triptane which comprises reacting 2,3-dimethylbutene-2 with chloromethyl methyl ether at a temperature of from about 0° to about 50° C. to form 2-chloro-4-methoxy-2,3,3-trimethylbutane, dehydrochlorinating said last named compound to form 4-methoxy-2,3,3-trimethylbutene-1, and reacting the latter with free hydrogen at hydrogenating and hydrogenolyzing conditions to form 2,2,3-trimethylbutane.

4. The process of claim 3 further characterized in that said reaction of 2,3-dimethylbutene-2 with chloromethyl methyl ether is effected in the presence of a mercuric chloride catalyst.

5. The process of claim 3 further characterized in that the dehydrochlorination step is effected by heating the 2-chloro-4-methoxy-2,3,3-trimethylbutane with methanol at a temperature of from about 150° to about 250° C.

6. The process of claim 3 further characterized in that said hydrogenation and hydrogenolysis step is effected in the presence of a nickel-containing hydrogenation catalyst.

LOUIS SCHMERLING.

REFERENCES CITED

The following references are of record in the file of this patent:

UNITED STATES PATENTS

| Number | Name | Date |
| --- | --- | --- |
| 2,024,749 | Scott | Dec. 17, 1935 |
| 2,075,313 | Straus | Mar. 30, 1937 |
| 2,122,812 | Groll et al. | July 5, 1938 |
| 2,143,021 | Martin | Jan. 10, 1939 |
| 2,143,364 | Taylor | Jan. 10, 1939 |
| 1,864,884 | Bauer | June 28, 1932 |
| 2,077,681 | Evans | Apr. 20, 1937 |

OTHER REFERENCES

Van Duzee et al., Jour. Am. Chem. Soc., vol. 57, 147–151 (1935). (Patent Office Library.)

Marty, Compte rendus, vol. 187, 47–9 (1928). (Patent Office Library.)